UNITED STATES PATENT OFFICE.

OTTO PAUL CURT BREDT, OF NEW YORK, N. Y.

PRODUCTION OF CONCENTRATED RADIUM RESIDUES AND THE SEPARATION OF RADIUM COMPOUNDS THEREFROM.

1,154,230.      Specification of Letters Patent.      Patented Sept. 21, 1915.

No Drawing.      Application filed June 26 1914. Serial No. 847,515.

*To all whom it may concern:*

Be it known that I, OTTO PAUL CURT BREDT, a citizen of the German Empire, residing at 170 William street, in the city, county, and State of New York, have invented new and useful Improvements in the Production of Concentrated Radium Residues and the Separation of Radium Compounds Therefrom, of which the following is a specification.

This invention relates to the concentration of radium-containing residues, slimes, precipitates, etc., and to the production of radium salts and compounds of high purity therefrom; and it comprises a process of treating such residues, slimes and precipitates, and more particularly those containing radium as sulfate together with other sulfates, such as those of barium strontium calcium, etc., with an amount of sodium or potassium hydroxid or carbonate or other suitable alkaline fusion mixture, insufficient to convert the radium sulfate into carbonates or hydrates but sufficient to convert most, e. g. 95%, of the remaining other sulfates into carbonates or hydrates, the radium however remaining as sulfate in the small unchanged residue, then separating the residue and repeating the process to further increase the content of radium sulfate in the residue; it further comprises a process of subsequently separating the radium sulfate from said residues and converting it by fusion with a sufficient amount of the alkali or carbonate into a soluble form which is then dissolved out with water; then adding an organic acid, such as acetic or formic acid to neutralize the alkali and to give an acid reaction; this solution is afterward concentrated in order to precipitate the radium as organic salts; these salts are separated and the precipitate is dissolved and again precipitated until a salt of the desired purity is obtained.

It further comprises certain novel features and modes of procedure, all as more fully hereinafter set forth and as claimed.

In the separation of radium from its ores such as carnotite, pitchblende, etc., it is customary to precipitate the radium as sulfate at various stages of the process. Thus the ores may be fused with sodium sulfate or acid sulfate or even with sulfuric acid. In this way the sulfates of metals which are more soluble such as those of uranium are brought into solution while the sulfate of radium remains in the slimes after lixiviation and removal of the sulfates of the other metals. Again solutions containing the radium, e. g. as chlorid, obtained by treating radium carbonate with hydrochloric acid, or by treating the ores with this acid, are often treated with a sulfate or sulfuric acid to precipitate the radium sulfate together with barium and other insoluble sulfates, because on account of the insoluble nature of the radium sulfate the latter is readily separated from solutions of sulfates of metals which are much more soluble. It is thus possible to separate metals such as iron, uranium and vanadium from radium ores, or to precipitate radium sulfate along with barium and other insoluble sulfates from solutions containing sulfates of such other metals.

In the fusion processes of the prior art it has been proposed to fuse the radium ore or the radium residues or slimes with sufficient alkali or carbonate to convert the whole amount of metals into a soluble form and to treat the soluble extract with hydrochloric acid, and it has also been proposed to boil such residues and slimes with alkalis for the same purpose. But such processes require the handling of large amounts of solutions and of reagents, and the extraction is difficult, repetitions of the process usually being necessary.

It is an object of the present invention to improve and simplify such extraction and concentration processes, and to minimize the disadvantages above mentioned.

It is a further object of the invention to produce and separate the radium in the form of organic salts of high purity.

In carrying out the process of the present invention the radium sulfate residues containing usually a mixture of barium, calcium and strontium sulfates and frequently insoluble silicates, etc., are freed from uranium, vanadium and other similar metals, in case these substances are still present. These latter metals can readily be removed in the manner above indicated, e. g., by extraction with a suitable slovent such as sulfuric acid, or by precipitating the insoluble mixture of barium and radium sulfates, etc., from their solutions. The sulfate residue containing mainly barium sulfate, or this sulfate together with calcium and strontium sulfates, silicates, etc., may contain, for example, 0.0000007 gram of radium sulfate per kilo. It will be understood that the amount of radium will differ, sometimes widely, with different ores and residues. Assuming that the sulfate mixture is principally barium sulfate enough sodium or potassium hydroxid or carbonate is added to convert only about 95% of this barium sulfate into carbonate, according to the equation.

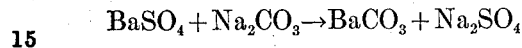

and the mixture is fused in a crucible or furnace for from half an hour to two hours, or until the desired reaction has been effected. The greatest part of barium is thus converted into the carbonate while all of the radium remains with the unchanged sulfate which residue represents about 5% of the original mixture. The fused charge is first treated with water to remove the water-soluble alkali metal sulfate; then the mass is treated with dilute hydrochloric acid to dissolve and remove the barium carbonate. The residue remaining undissolved contains the radium as sulfate. This residue is now separated by filtration and is a more concentrated radium sulfate residue than that originally used. The process is repeated, as many times as may be necessary, in order to further increase the radium content, each repetition resulting in the removal of a large amount, e. g., about 95%, of the barium sulfate and in the corresponding increase in concentration of the radium in the undissolved fraction, until the finally obtained residue contains about 1% or less of the radium sulfate. This residue is itself of a sufficient strength to be used for various purposes. It may however be further purified and concentrated.

I have found the following to be an advantageous method of separating the radium in a state of high purity. The radium-sulfate residue, containing, e. g. 1% or less of radium sulfate is fused with sufficient of the fusion mixture, e. g. sodium hydroxid or carbonate to render it soluble, i. e., convert the sulfates of radium and barium into carbonates or hydrates, the sodium sulfate is then dissolved out with water, leaving the barium and radium carbonates free from sulfates. The carbonate solutions are then acidified with an organic acid such as acetic or formic acid or other aliphatic acid and the acid solutions are concentrated by evaporation. The radium salts of the organic acids separate out with the first half of the crystals formed, and are thus removed. By repeating the operations of solution and fractional precipitation of these crystals their purity can be increased until a substantially 100% product is obtained. Instead of using water for the purification, methyl or ethyl alcohol can be used.

The process of the present invention making use of less than the required amount of alkali for converting the sulfates into a soluble form results in the production of a more concentrated, insoluble radium residue and effects a considerable shortening of the process. It is thus possible to obtain final results in from one to one and a half months, instead of requiring a year or more, as in the case of hitherto known processes. The isolation of the radium as an organic salt also presents a great advantage over the isolation as chlorid or bromid by which methods salts free from impurities are only obtained with difficulty.

It will be understood that residues of different origin and radium contents can be treated in the same manner, and it will also be understood that the specific procedure described can be varied without departing from the invention. The amount of the barium sulfate removed by each treatment may thus be varied from 95% and as the concentration of the radium increases this percentage may be increased, as will be understood.

I claim:

1. The process of concentrating the radium contents in sulfate residues containing radium sulfate which comprises fusing such residues with an amount of alkali insufficient to convert all of the sulfate into a soluble form and removing the soluble sulfate and the acids soluble constituents from the insoluble residue containing the radium sulfate.

2. The process of concentrating the radium contents in sulfate residues containing radium sulfate which comprises fusing such residues with an amount of alkali insufficient to convert all of the sulfate into a soluble form, removing the soluble sulfate and the acids soluble constituents from the insoluble residue containing the radium sulfate, and repeating the process until the radium sulfate remaining in the insoluble residue has reached the desired concentration.

3. The process of concentrating the radium contents in sulfate residues containing radium and barium sulfates which comprises fusing such residues with an amount of an alkali sufficient to convert about 95% of the sulfate into a soluble form, and removing the soluble sulfate and the acid-soluble barium compounds from the radium sulfate-containing residues.

4. The process of concentrating the radium contents in sulfate residues containing radium and barium sulfates which comprises fusing such residues with an amount of an alkali sufficient to convert about 95% of the sulfate into a soluble form, removing the acid-soluble sulfate and the soluble barium compounds from the insoluble radium sulfate-containing residues and repeating the process until the radium sulfate remaining in the insoluble residue has reached the desired concentration.

5. The process of concentrating the radium contents in sulfate residues containing radium sulfate which comprises fusing such residues with an amount of an alkali carbonate fusion mixture insufficient to convert all of the sulfate into carbonate, and removing the resulting soluble sulfate and acid-soluble carbonate.

6. The process of concentrating the radium contents in the sulfate residues containing radium sulfate which comprises fusing such residues with an amount of an alkali carbonate fusion mixture insufficient to convert all of the sulfate into carbonate, removing the resulting soluble sulfate and acid-soluble carbonate and repeating the process until the radium sulfate remaining in the insoluble residue has reached the desired concentration.

7. The process of concentrating the radium contents in sulfate residues containing radium sulfate which comprises fusing such residues with an amount of an alkali carbonate fusion mixture insufficient to convert all of the sulfate into carbonate, and removing the resulting soluble sulfate and carbonate by treatment with water and then with hydrochloric acid.

8. The process of concentrating the radium contents in sulfate residues which comprises fusing such residues with an amount of an alkali carbonate fusion mixture sufficient to convert about 95% of the sulfate into carbonate, and removing from the fused mass the resulting soluble sulfate and acid-soluble carbonate.

9. The process of concentrating the radium contents in sulfate residues which comprises fusing such residues with an amount of an alkali carbonate fusion mixture sufficient to convert about 95% of the sulfate into carbonate, removing from the fused mass the resulting soluble sulfate and acid-soluble carbonate and repeating the process until the radium sulfate remaining in the insoluble residue has reached the desired concentration.

10. The process of concentrating the radium contents in sulfate residues which comprises fusing such residues with an amount of an alkali carbonate fusion mixture sufficient to convert about 95% of the sulfate into carbonate, and removing the resulting soluble sulfate and carbonate by treatment with water and then with hydrochloric acid.

11. The process of cencentrating the radium contents in sulfate residues which comprises fusing such residues with an amount of alkali insufficient to convert all of the sulfate into a soluble form, removing the soluble sulfate and acid-soluble constituents from the insoluble residue containing the radium sulfate, repeating the process until the radium sulfate remaining in the insoluble residue has reached the desired concentration, adding an amount of the alkali fusion mixture sufficient to convert substantially all the remaining radium sulfate residue into a soluble form, removing the soluble alkali metal sulfate with water, acidifying the residue with a water-soluble organic acid, concentrating the acid solution, and separating the organic radium salt by fractional crystallization.

12. The process of concentrating the radium contents in sulfate residues containing radium and barium sulfates which comprises fusing such residues with an amount of an alkali sufficient to convert about 95% of the sulfate into a soluble form, removing the soluble sulfate and the acid-soluble alkalis from the insoluble radium sulfate-containing residues, adding an amount of the alkali fusion mixture sufficient to convert substantially all the remaining radium sulfate residue into a soluble form, removing the soluble alkali metal sulfate with water, acidifying the residue with a water-soluble organic acid, concentrating the acid solution, and separating the organic radium salt by fractional crystallization.

13. The process of separating radium from concentrated radium sulfate residues which comprises fusing such residues with an excess of an alkali fusion mixture to form alkali metal sulfate and acid-soluble radium compounds, removing the soluble alkali metal sulfates with water, acidifying the residue with a water soluble organic acid, and separating the organic radium salts from the acidified solution by concentration and fractional precipitation.

14. The process of separating radium in the form of its organic salt from soluble radium compounds which comprises adding an organic acid soluble in water to dissolve the radium as a salt of such acid, evaporating the acid solution, and separating the radium as its organic acid salt by fractional precipitation.

15. The process of separating radium in the form of its organic salt from soluble radium compounds which comprises adding an organic acid soluble in water to dissolve the radium as a salt of such acid, evaporating the acid solution, separating the radium as its organic acid salt by fractional precipitation, and further purifying the resulting organic salt by further solution and fractional precipitation.

16. The process of separating radium in the form of its organic salt from soluble radium compounds which comprises adding an aliphatic acid soluble in water to dissolve the radium as a salt of such acid, evaporating the acid solution, and separating the radium as its aliphatic acid salt by fractional precipitation.

17. The process of separating radium in the form of its organic salt from soluble radium compounds which comprises adding an aliphatic acid soluble in water to dissolve the radium as a salt of such acid, evaporating the acid solution, separating the radium as its aliphatic acid salt by fractional precipitation, and further purifying the resulting aliphatic acid salt by further solution and fractional crystallization.

18. A new product comprising a radium salt of a monobasic alifatic acid.

19. A new product comprising radium formate.

20. A new product comprising a mixture of radium and barium salts of an alifatic acid.

21. A new product comprising a mixture of radium and barium formates.

In testimony whereof I have hereunto set my hand in the presence of two subscribing witnesses.

OTTO PAUL CURT BREDT.

Witnesses:
 HENRY S. CLARK,
 ALBERT J. CRAMP.

Copies of this patent may be obtained for five cents each, by addressing the "Commissioner of Patents, Washington, D. C."